April 7, 1970 A. H. BOBECK 3,505,660

MAGNETIC DOMAIN WALL SHIFT REGISTER CIRCUIT

Filed Jan. 17, 1967

INVENTOR
A. H. BOBECK
BY Herbert M. Shapiro
ATTORNEY

United States Patent Office 3,505,660 Patented Apr. 7, 1970

3,505,660
MAGNETIC DOMAIN WALL SHIFT REGISTER CIRCUIT

Andrew H. Bobeck, Chatham, N.J., assignor to Bell Telephone Laboratories, Incorporated, Murray Hill, N.J., a corporation of New York

Filed Jan. 17, 1967, Ser. No. 609,841
Int. Cl. G11c *11/14*
U.S. Cl. 340—174 4 Claims

ABSTRACT OF THE DISCLOSURE

A domain wall shift register is operated on a collapse mode basis. Reverse magnetized domains normally spuriously generated at the end of the magnetic medium of a domain wall shift register in response to fields in excess of a propagation threshold are collapsed selectively in response to relatively low level inputs as they are propagated toward an output position. Binary ones and zeros are represented at the output position by the absence and presence of reverse domains, respectively.

FIELD OF THE INVENTION

This invention relates to magnetic data processing circuitry and has for its primary object an improved domain wall device for shifting information along propagation channels.

BACKGROUND OF THE INVENTION

Domain wall devices are disclosed in K. W. Broadbent Patent 2,919,432, issued Dec. 29, 1959. Such a device comprises a magnetic medium in which a reverse magnetized domain is nucleated by a nucleation field in excess of a nucleation threshold and in which reverse domains are propagated in response to propagation fields in excess of a propagation threshold and less than the nucleation threshold. The device is operated by initializing the magnetic medium to a first direction of magnetization and thereafter selectively reversing a portion of the medium to a second direction of magnetization forming a reverse domain. The propagation of reverse domains is accomplished typically by a four-phase propagation field applied to consecutive spaced apart portions of the medium, as is well known, to move the leading and trailing walls of each reverse domain in the same direction toward an output position. A detector coupled to the output position indicates binary one and binary zero values corresponding to the presence and absence of domains, respectively, in the proper time slots. The magnetic medium is conveniently a magnetic wire as disclosed in copending application Ser. No. 405,692 filed Oct. 22, 1964 for D. H. Smith and E. M. Tolman, now Patent No. 3,350,199 issued Oct. 31, 1967, or a magnetic film as disclosed in the above-mentioned Broadbent patent, or in copending applications Ser. No. 579,995 now Patent No. 3,454,939 of P. C. Michaelis, and Ser. No. 579,931 now Patent No. 3,460,116 of A. H. Bobeck, U. F. Gianola, R. C. Sherwood and W. Shockley, both filed Sept. 16, 1966.

The magnetic media used in such devices normally provide spurious domains by what are known as edge effects. For example, a domain wall wire provides spurious reverse domains at its ends primarily because of the presence of a domain wall there. In such a case, the propagation fields advance that wall from the end of the wire forming the spurious domains.

Normally, steps are taken for avoiding the spurious domains. Such steps take the form of a treatment for the ends of the wires, or the deposition of an edge film of different characteristics in the case of film implementations. In addition, biasing means may be provided to prevent nucleation of spurious domains or to act as a "sink" for such domains once nucleated. Alternatively, propagation coils may be removed from the end portions of the magnetic medium. All such means for avoiding spurious reverse domains are well known in the art. Unfortunately, each additional processing step or added implementation is costly and to be avoided.

SUMMARY OF THE INVENTION

In accordance with this invention, such spurious domains, rather than being avoided, are turned to account in a manner which not only saves the cost of avoiding such domains but which also provides additional operational advantages, as will become clear. Specifically, the advantages of this invention are realized in one embodiment thereof wherein the end of a domain wall wire provides a continuous stream of reverse domains in response to the pulses, of the four-phase propagation sequence, of favorable polarity is provided in the vicinity of that end. Consequently, the wire is filled with reverse domains spaced apart by customary buffer zones. The domains are propagated past an input position toward an output position. Fields of a polarity to oppose the advance of reverse domains are generated at the input position in response to an input data stream. Each input field annihilates a corresponding reverse domain. If such an input is absent, the corresponding domain passes. The presence and absence of domains at the output position represents the input data stream.

Accordingly, a feature of this invention is a domain wall propagation channel including means generating a continuous stream of reverse magnetized domains, means moving the continuous stream past an input position toward an output position and means selectively collapsing reverse domains at the input position responsive to input signals.

Not only does such an arrangement avoid the problem of spurious reverse domain generation, but also permits a reduction in input power because fields of "propagation" levels are all that the input operation requires. This is in contradistinction to fields of "nucleation" levels required by prior art arrangements. In addition, media with an essentially uniform propagation threshold is relatively easy to provide, whereas the nucleation threshold of most available media are not nearly so uniform. Further, the nucleation threshold in the bulk of the medium employed may be made excessively high such that relatively high propagation fields may be employed without introducing additional spurious domains, thus permitting relatively high operating speeds.

DETAILED DESCRIPTION

Figure 1:
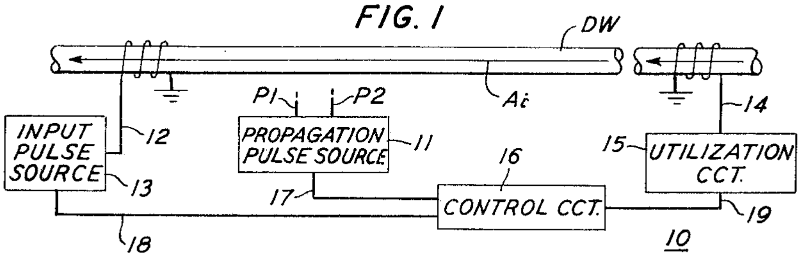
FIG. 1 is a schematic representation of a wire domain wall shift register in accordance with this invention.

FIG. 1 shows an illustrative magnetic wire domain wall shift register 10 in accordance with this invention. The register comprises a domain wall wire DW to which propagation conductors P1 and P2 are coupled. The manner of coupling between the propagation conductors and the domain wall wire is well known. The couplings are illustrated here by spaced apart coil indications, beneath the representation of wire DW in FIG. 2. As is customary, the coils conveniently overlap one another coupling next adjacent portions along wire DW. Consecutive coils C1, C2, C3, and C4 define a bit location in wire DW and a reverse domain usually occupies one-half of such a bit location. Conductors P1 and P2 are connected between a propagation pulse source 11 and ground.

Figure 2:
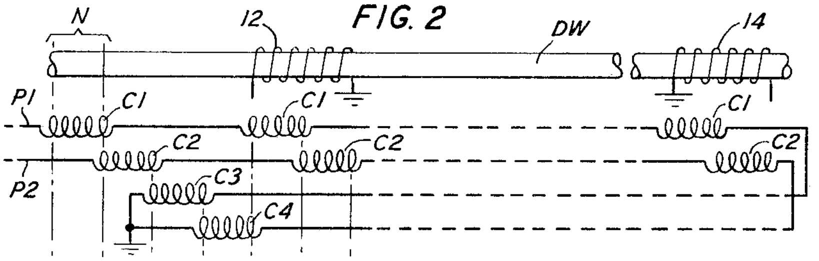
FIGS. 2 through 6 are schematic representations of portions of the shift register of FIG. 1 showing the condition of the magnetic wire during operation.

An input conductor couples an input portion of wire DW defined by a first set of consecutive C1 and C2 coils as shown in FIG. 2. Conductor 12 is connected between input pulse source 13 and ground.

An output conductor 14 couples an output portion of wire DW defined by a second set of consecutive C1 and C2 coils spaced apart from the first set again as shown in FIG. 2. Conductor 14 is connected between a utilization circuit 15 and ground.

Pulse sources 11 and 13 and utilization circuit 15 are connected to a control circuit 16 by means of conductors 17, 18, and 19, respectively. The various sources and circuit may be any such elements capable of operating in accordance with this invention.

Wire DW is assumed in an initialized magnetization condition represented by an arrow A*i* directed to the left as viewed in FIG. 1. Operation is initiated by the provision of propagation pulses +P1, +P2, −P1, and −P2 on conductors P1 and P2 by means of propagation pulse source 11 under the control of control circuit 16. Such pulses are shown initiated at a time *t*0 in the pulse diagram of FIG. 7.

Figure 3:
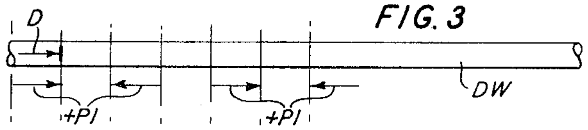

The pulse +P1 generates the field pattern shown by the arrows, designated +P1 to correspond to the conductor pulsed, shown beneath the representation of wire DW in FIG. 3. The field pattern so generated is well known and not discussed further. It is to be noted that the field corresponding in position to coil C1 in FIG. 2 to the extreme left as viewed in FIGS. 2 and 3 "nucleates" a reverse domain D in position N. The term "nucleates" in this context of course refers to the advance of a domain wall always present, but not shown, at the end of wire DW in position N. Importantly, that advancing field is less than the nucleation threshold of the wire, yet effects the nucleation of a reverse domain because of presence of a wall at position N.

Figure 4:
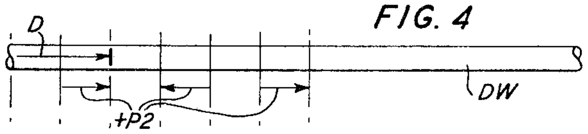
Figure 5:
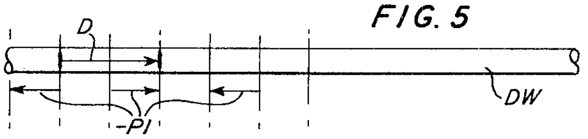

The second propagation pulse +P2 expands domain D to the right as viewed in FIG. 4. Again the field pattern is represented by arrows beneath wire DW in FIG. 4. The next consecutive propagation pulse −P1 advances domain D in conventional fashion without expanding the domain as shown in FIG. 5. The following pulse, −P2, advances domain D to the input position coupled by input conductor 12. One propagation sequence is complete.

The first pulse of the next consecutive propagation pulse sequence advances domain D into the portion of wire DW coupled by the input conductor and simultaneously "nucleates" on additional domain in position N as shown in FIG. 3. The propagation pulses are applied by means of source 11 under the control of control circuit 16.

Figure 6:
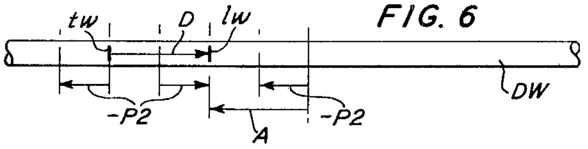

Assume that an illustrative 101 binary input is received, by means of conductor 12 under the control of control circuit 16, as consecutive reverse domains are advanced into that portion of wire DW as just described. A one input is assumed to correspond to a pulse in conductor 12; a zero input corresponds to a null in conductor 12. A pulse P12 in conductor 12 generates a field represented by an arrow A directed to the left in the corresponding portion of wire DW as shown in FIG. 6. Such a field is seen to oppose the advance of domain D by stopping the leading wall *lw* while the trailing wall *tw* is advanced by propagation fields. In this mode of operation, the pulse P12 is of a duration about equal to the duration of two consecutive propagation pulses as shown at time *t*1 in FIG. 7. In response, the reverse domain collapses. In an alternative mode of operation, pulse P12 is applied after propagation pulses +P1 and +P2 advance a reverse domain into the input position and before later propagation pulses advance the domain beyond that position. In the latter instance, an input pulse may be relatively short.

Figure 7:
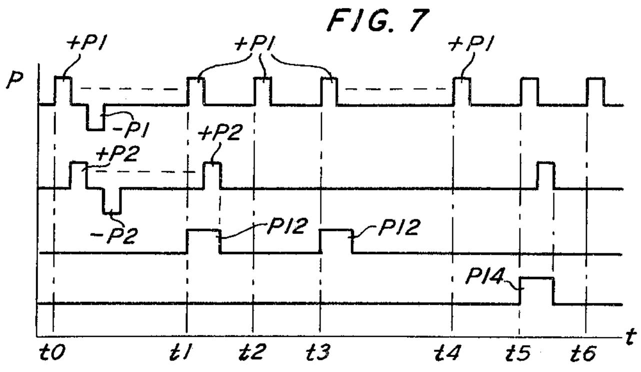
FIG. 7 is a pulse diagram of the operation of the shift register of FIG. 1.

In accordance with the illustrative operation, a null appears in conductor 12 when the next consecutive reverse domain is advanced to the input position. Next, an input pulse appears. The absence and presence of inputs are shown in FIG. 7 at times *t*2 and *t*3, respectively.

Consecutive propagation pulse sequences advance the now coded domain stream to the position of conductor 14 where the absence, presence, and absence of pulses represents the 101 input information. Such information is detected by utilization circuit 15 under the control of control circuit 16. Utilization circuit 15 conveniently includes an inverter to this end. The absence, presence, and absence of an output pulse P14 is indicated in FIG. 7 at times *t*4, *t*5, and *t*6, respectively.

Arrangements of the type described have been operated with speeds in the 50 kilocycle range. Input pulses of 1 ampere turn were employed. Propagation pulses were of the order of 1 ampere turn and outputs of 1 millivolt were realized.

As should be apparent to one skilled in the art, operation in a parallel input mode may be implemented in a similar manner.

What has been described is considered to be only illustrative of the principles of this invention. Accordingly, various and numerous other arrangements may be devised by one skilled in the art without departing from the spirit and scope of this invention.

I claim:

1. A magnetic circuit comprising a magnetic medium in which a reverse domain can be generated in response to a nucleation field in excess of a nucleation threshold and in which reverse domains are propagated in response to propagation fields in excess of a propagation threshold and less than said nucleation threshold, a source of doman walls responsive to a propagation field for providing reverse domains in a first portion of said medium, means for providing propagation fields in said medium for advancing reverse domains along said medium past an input position toward an output position, means responsive to input signals for selectively generating a third field less than said nucleation threshold for collapsing selectively reverse domains in said input position, and means detecting the presence and absence of domains in said output position.

2. A circuit in accordance with claim 1 wherein said magnetic medium is a magnetic wire.

3. A circuit in accordance with claim 2 wherein said source of domain walls is the end of the magnetic wire.

4. A domain wall shift register comprising a magnetic wire having a nucleation threshold and including an end portion, and means for generating in said wire, including said end portion, first fields less than said nucleation threshold for propagating reverse magnetized domains in said wire past an input position to an output position, said shift register being characterized in that said end portion of said wire generates a continuous stream of reverse domains in response to said first fields and including means responsive to input signals selectively providing said first field in said input position for collapsing reverse domains there.

References Cited

UNITED STATES PATENTS

| | | | |
|---|---|---|---|
| 3,436,748 | 4/1969 | Kaenel | 340—174 |
| 3,439,351 | 4/1969 | Smith | 340—174 |
| 3,439,352 | 4/1969 | Fischer | 340—174 |
| 3,092,813 | 6/1963 | Broadbent | 340—174 |
| 3,137,845 | 6/1964 | Synder | 340—174 |

OTHER REFERENCES

A Magnetic Shift Register Employing Controlled Domain Wall Motion, by D. H. Smith, IEEE Transactions on Magnetics, vol. Mag.–1, No. 4, December, 1965, pp. 281–284.

JAMES W. MOFFITT, Primary Examiner

K. E. KROSIN, Assistance Examiner

U.S. Cl. X.R.

307—88, 221